United States Patent [19]
Dutton et al.

[11] Patent Number: 6,061,756
[45] Date of Patent: *May 9, 2000

[54] COMPUTER SYSTEM WHICH PERFORMS INTELLIGENT BYTE SLICING/DATA PACKING ON A MULTI-BYTE WIDE BUS

[75] Inventors: Drew J. Dutton; Scott E. Swanstrom; J. Andrew Lambrecht, all of Austin, Tex.

[73] Assignee: Advanced Micro Devices, Inc., Sunnyvale, Calif.

[*] Notice: This patent is subject to a terminal disclaimer.

[21] Appl. No.: 09/089,025

[22] Filed: Jun. 2, 1998

Related U.S. Application Data

[63] Continuation-in-part of application No. 08/989,329, Dec. 11, 1997, which is a continuation-in-part of application No. 08/926,729, Sep. 10, 1997, Pat. No. 5,872,942, which is a continuation of application No. 08/650,939, May 17, 1996, Pat. No. 5,790,815, which is a continuation of application No. 08/559,661, Nov. 20, 1995, Pat. No. 5,754,807, said application No. 08/989,329, and a continuation-in-part of application No. 08/559,661.

[51] Int. Cl.$^7$ .................................................... G06F 13/38
[52] U.S. Cl. ........................................... 710/129; 710/127
[58] Field of Search ........................................ 710/67–132

[56] References Cited

U.S. PATENT DOCUMENTS

| | | | |
|---|---|---|---|
| 4,237,551 | 12/1980 | Narasimha | 370/50 |
| 4,710,917 | 12/1987 | Tompkins et al. | 370/62 |
| 5,084,868 | 1/1992 | Kelly et al. | 370/69.1 |
| 5,113,496 | 5/1992 | McCalley et al. | 395/200 |
| 5,170,252 | 12/1992 | Gear et al. | 358/181 |
| 5,172,413 | 12/1992 | Bradley et al. | 380/20 |
| 5,241,632 | 8/1993 | O'Connell et al. | 395/325 |
| 5,487,167 | 1/1996 | Dinallo et al. | 395/650 |
| 5,613,162 | 3/1997 | Kabenjian | 395/842 |
| 5,757,794 | 5/1998 | Young | 370/362 |

*Primary Examiner*—Ayaz R. Sheikh
*Assistant Examiner*—Jigar Pancholi
*Attorney, Agent, or Firm*—Conley, Rose & Tayon, P.C.; Louis H. Iselin

[57] ABSTRACT

A computer system optimized for real-time applications which provides increased performance over current computer architectures. The system includes a standard local system bus or expansion bus, such as the PCI bus, and may also include a dedicated real-time bus or multimedia bus. Various multimedia devices are coupled to one or more of the expansion bus and/or the multimedia bus. The computer system includes byte slicing and/or data packing logic coupled to one or more of the expansion bus and/or the multimedia bus which operates to allow different data streams to use different byte channels simultaneously. Thus the byte sliced bus allows different peripherals to share the bus simultaneously. The byte slicing logic thus may assign one data stream to a subset of the total byte lanes on the multimedia bus, and fill the unused byte lanes with another data stream. The data packing logic may optimally fill the bus with data having more or fewer bits than the bus. The computer system of the present invention thus provides much greater performance for real-time applications than prior systems.

13 Claims, 8 Drawing Sheets

| | T1 | T2 | T3 | T4 | T5 | T6 | T7 | T8 | T9 | T10 | T11 | T12 |
|---|---|---|---|---|---|---|---|---|---|---|---|---|
| BYTE LANE 1 | C S1, D1 | S1, B1 D1 | S1, B3 D1 | S1, B5 D1 | S1, B7 D1 | C S1, D1 | S1, B9 D1 | S1, B10 D1 | S1, B11 D1 | S1, B12 D1 | C S1, D1 | S1, B13 D1 |
| BYTE LANE 2 | C S1, D1 | S1, B2 D1 | S1, B4 D1 | S1, B6 D1 | S1, B8 D1 | C S6, D6 | S6, B1 D6 | S6, B2 D6 | S6, B3 D6 | S6, B4 D6 | C S6, D6 | S6, B5 D6 |
| BYTE LANE 3 | C S2, D2 | S2, B1 D2 | S2, B2 D2 | S2, B3 D2 | S2, B4 D2 | C S2, D2 | S2, B5 D2 | X | X | X | C S4, D2 | S4, B1 D2 |
| BYTE LANE 4 | C, S3 D3, D4 | S3, B1 D3, D4 | S3, B2 D3, D4 | S3, B3 D3, D4 | S3, B4 D3, D4 | C, S3 D3, D4 | S3, B5 D3, D4 | S3, B6 D3, D4 | S3, B7 D3, D4 | X | C S3, D5 | S3, B1 D5 |

C=CONTROL CODES, S=SOURCE, D=DESTINATION, B=BYTE, T=TRANSFER, X=NO DATA

COMPUTER SYSTEM WHICH PERFORMS INTELLIGENT BYTE SLICING/DATA PACKING ON A MULTI-BYTE WIDE BUS

CONTINUATION DATA

This is a continuation-in-part of co-pending application Ser. No. 08/989,329 titled "Computer System which Performs Intelligent Byte Slicing on a Multi-Byte Wide Bus" filed Dec. 11, 1997, whose inventors are Drew J. Dutton, Scott E. Swanstrom and J. Andrew Lambrecht, which is a continuation-in-part of application Ser. No. 08/926,729, now U.S. Pat. No. 5,872,942, titled "Computer System Having A Multimedia Bus and Comprising a Centralized I/O Processor which Performs Intelligent Byte Slicing" filed Sep. 10, 1997, whose inventors are Scott Swanstrom and Steve L. Belt, which is a continuation of application Ser. No. 08/650,939, now U.S. Pat. No. 5,790,815, filed May 17, 1996, which is a continuation of application Ser. No. 08/559,661, now U.S. Pat. No. 5,754,807 filed Nov. 20, 1995, application Ser. No. 08/989,329 is also a continuation-in-part of application Ser. No. 08/559,661, now U.S. Pat. No. 5,754,807.

FIELD OF THE INVENTION

The present invention relates to a computer system which includes a system expansion bus such as the Peripheral Component Interconnect (PCI) bus and/or also includes a separate real-time or multimedia bus which transfers periodic and/or multimedia stream data, wherein the system includes intelligent multimedia devices which perform byte slicing and/or data packing on one or more of the buses for increased system performance.

DESCRIPTION OF THE RELATED ART

Computer architectures generally include a plurality of devices interconnected by one or more various buses. For example, modem computer systems typically include a CPU coupled through bridge logic to main memory. The bridge logic also typically couples to a high bandwidth local expansion bus or system expansion bus, such as the peripheral component interconnect (PCI) bus or the VESA (Video Electronics Standards Association) VL bus. Examples of devices that can be coupled to local expansion buses include video accelerator cards, audio cards, telephony cards, SCSI adapters, network interface cards, etc. An older type expansion bus is generally coupled to the local expansion bus for compatibility. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system, wherein the expansion bus is designed for non-realtime applications.

In many cases, multimedia hardware cards situated on an expansion bus do not have the required system bus bandwidth or throughput for multimedia data transfers. For example, a multimedia hardware card situated on the PCI expansion bus must first arbitrate for control of the PCI bus before the device can begin a data transfer or access the system memory. In addition, since the computer system architecture is not optimized for multimedia, multimedia hardware devices are generally required to share bus usage with non-real time devices.

In a computer system, buses provide transaction paths between many sources and destinations. Current systems allow one source and one (or more) destination(s) to communicate at any one time. In order to meet time critical needs for delivery of information across these buses, the buses are usually designed to have higher bandwidth than any one device would require. Multiple data sources and destinations share the bus through the use of shortened (in terms of time), higher speed transfers than the "natural" speed of the information being transferred. In addition, information is often grouped into wider data widths than the "natural" data unit size in order to utilize more of the bus width to reduce the total time the bus is used by one source transmitting data.

As multimedia applications become more prevalent, multimedia hardware will correspondingly become essential components in personal computer systems. Therefore, an improved computer system architecture is desired which is optimized for real-time multimedia and communications applications as well as for non-realtime applications. In addition, improved methods are desired for transferring real-time data between multimedia devices.

SUMMARY OF THE INVENTION

The present invention comprises a computer system and method optimized for real-time applications which provides increased performance over current computer architectures. The system preferably includes a standard local expansion bus or system bus, such as the PCI bus, and/or also includes a dedicated real-time bus or multimedia bus. One or more of the system expansion bus or the multimedia bus comprises a byte sliced and/or data packed bus. A plurality of multimedia devices, such video devices, audio devices, MPEG encoders and/or decoders, and/or communications devices, is coupled to each of the PCI bus and the multimedia bus. Thus multimedia devices, as well as communications devices, may transfer real-time data through a separate byte sliced and/or data packed bus without requiring arbitration for or usage of the PCI bus. The computer system of the present invention thus provides much greater performance for real-time applications than prior systems. In an alternate embodiment, the computer system only includes one or more dedicated real-time byte sliced and/or data packed buses which replace the PCI bus.

According to the present invention, each of the peripherals include byte slicing and/or data packing logic which formats data into byte slices and/or time slices on the multimedia bus to allow different data streams to use and preferably fill different byte channels simultaneously and during all available transfer times or time-slices. Thus the byte sliced and/or data packed multimedia bus allows different peripherals to share the bus simultaneously. The individual byte slicing logics arbitrate among themselves to assign one data stream to a subset of the total byte lanes on the multimedia bus, and fill the unused byte lanes with another data stream. For example, with a 32-bit multimedia bus, if an audio data stream is only 16 bits wide and thus only uses half of the multimedia data bus, the multimedia bus intelligently allows data stream transfers on the unused bits of the bus. The devices thus collectively operate to pack all of the byte lanes of the bus.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENTS

Incorporation by Reference

*PCI System Architecture* by Tom Shanley and Don Anderson and available from Mindshare Press, 2202 Buttercup Dr., Richardson, Tex. 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

The PCI Multimedia Design Guide Revision 1.0, dated Mar. 29, 1994, as well as later revisions, are hereby incorporated by reference in their entirety.

The following U.S. patent application is hereby incorporated by reference in its entirety as though fully and completely set forth herein:

U.S. patent application Ser. No. 08/989,329 titled "Computer System which Performs Intelligent Byte Slicing on a Multi-Byte Wide Bus" filed Dec. 11, 1997, whose inventors are Drew J. Dutton, Scott E. Swanstrom and J. Andrew Lambrecht.

Computer System Block Diagram

Figure 1:
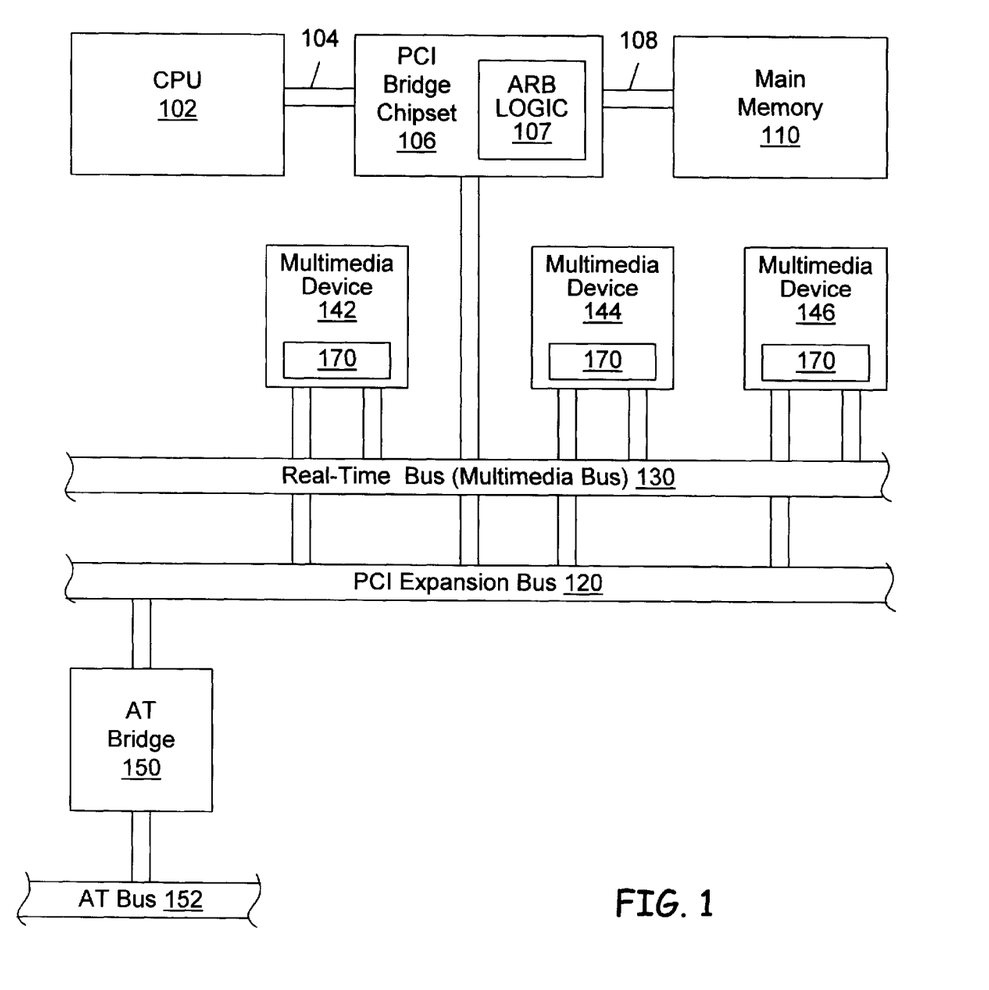
FIG. 1 is a block diagram of a computer system including a local expansion bus and a real-time bus or multimedia bus according to the present invention.

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset logic 106. The chipset logic 106 includes various bridge logics and includes arbitration logic 107. The chipset logic 106 is preferably similar to the Triton chipset available from Intel Corporation, including certain arbiter modifications to accommodate the real-time bus of the present invention. A second level or L2 cache memory (not shown) may be coupled to a cache controller in the chipset logic 106, as desired. The bridge or chipset logic 106 couples through a memory bus 108 to main memory 110. The main memory 110 is preferably DRAM (dynamic random access memory) or EDO (extended data out) memory, or other types of memory, as desired.

The chipset logic 106 preferably includes a memory controller for interfacing to the main memory 110 and also includes the arbitration logic 107. The chipset logic 106 preferably includes various peripherals, including an interrupt system, a real time clock (RTC) and timers, a direct memory access (DMA) system, and ROM/Flash memory (all not shown). Other peripherals (not shown) are preferably comprised in the chipset logic 106, including communications ports, diagnostics ports, command/status registers, and non-volatile static random access memory (NVSRAM).

The host/PCI/cache bridge or chipset logic 106 also interfaces to a local expansion bus or system bus 120. In the preferred embodiment, the local expansion bus 120 is the peripheral component interconnect (PCI) expansion bus 120. However, it is noted that other local buses and/or expansion buses may be used. Various tapes of devices may be connected to the PCI bus 120.

The computer system shown in FIG. 1 also preferably includes a real-time bus, also referred to as a multimedia bus 130. The multimedia bus 130 preferably includes a 32 or 64 bit data path and may also include address and control lines. The address and control lines may be separate from the data lines, or they may be unified.

One or more multimedia devices or multimedia devices 142, 144, and 146 are coupled to each of the PCI bus 120 and/or the multimedia bus 130. The multimedia devices 142–146 include interface circuitry 170 which includes standard PCI interface circuitry for communicating on the PCI bus 120. For devices which connect to the multimedia bus, the interface circuitry 170 in the multimedia devices 142–146 also includes interface logic for interfacing to the multimedia bus 130. The multimedia devices 142–146 use the multimedia bus 130 to communicate data, preferably only byte sliced data, between the respective devices.

The multimedia devices 142–146 may be any of various types of input/output devices, including multimedia devices and communication devices. For example, the multimedia devices 142–146 may comprise video accelerator or graphics accelerator devices, video playback devices, MPEG encoder or decoder devices, sound devices, network interface devices, SCSI adapters for interfacing to various input/output devices, such as CD-ROMS and tape drives, or other devices as desired.

Thus, the multimedia devices 142–146 may communicate with each other via the PCI expansion bus 120 and also communicate with the CPU and main memory 110 via the PCI expansion bus 120, as is well known in the art. The multimedia devices 142–146 may also or alternatively communicate data between each other using the real-time bus or multimedia bus 130. When the multimedia devices 142–146 communicate using the real-time bus 130, the devices are not required to obtain PCI bus mastership and they consume little or no PCI bus cycles.

According to the present invention, two or more of the multimedia devices 142–146 include data packing logic 178, and/or optionally byte slicing logic 176. The data packing logic 178 in a respective device 142–146 enables the device to data pack one or both of the PCI expansion 120 and the multimedia bus 130. The byte slicing logic 176 in a first multimedia device 142 is operable to assign a data stream to a subset of the available data channels on the bus 130 while allowing the byte slicing logic 176 in a second multimedia device 144 to transfer another data stream concurrently over another subset of the available data channels on the bus 130. Data streams may interrupt each other or be reassigned to more or fewer data channels as necessary. Interruptions and reassignments may occur at any time during the transmission and do not require retransmission of the interrupted portion of the transmission. Data packing logic 178 allows data types that do not match the width of the bus 120/130 or byte lane to maximize the use of the bus 120/130 or byte lane. Further details regarding the operation of the data packing logic 178 is given below.

AT expansion bus bridge logic 150 may also be coupled to the PCI bus 120. The AT expansion bus bridge logic 150 interfaces to an AT expansion bus 152. The expansion bus 152 may be any of varying types, preferably the industry standard architecture (ISA) bus also referred to as the AT bus, the extended industry standard architecture (EISA) bus, or the microchannel architecture (MCA) bus. Various devices may be coupled to the AT expansion bus 152, such as expansion bus memory or a modem (both not shown).

Alternative Computer System Block Diagram

Figure 2:
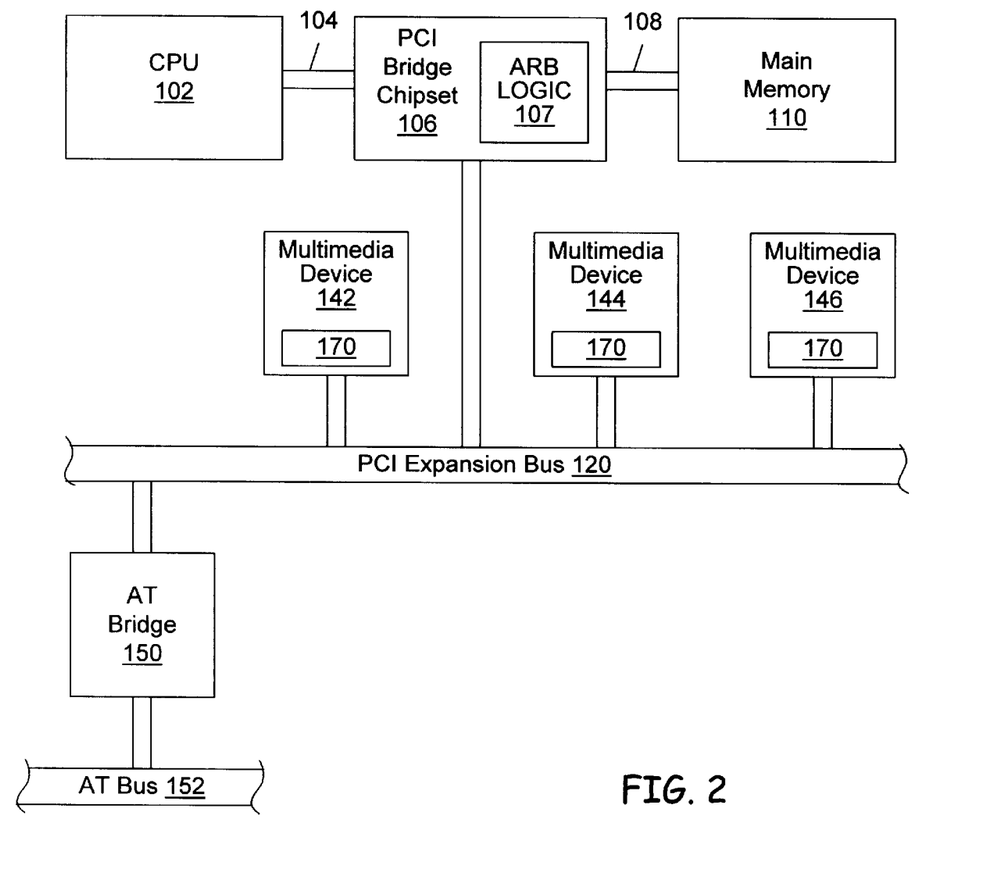
FIG. 2 is a block diagram of an alternate embodiment of the computer system of FIG. 1.

Referring now to FIG. 2, a block diagram of another embodiment of a computer system according to the present invention is shown. As shown, the computer system includes a central processing unit (CPU) 102 which is coupled through a CPU local bus 104 to a host/PCI/cache bridge or chipset logic 106. The chipset logic 106 includes various types of logic, including bridge logic and arbitration logic 107. The chipset logic 106 is preferably similar to the Triton chipset available from Intel Corporation, including certain arbiter modifications to accommodate the real-time bus of the present invention. A second level or L2 cache memory (not shown) may be coupled to a cache controller in the chipset logic 106, as desired. The bridge or chipset logic 106 couples through a memory bus 108 to main memory 110.

The main memory 110 is preferably DRAM (dynamic random access memory) or EDO (extended data out) memory, or other types of memory, as desired.

The chipset logic 106 preferably includes a memory controller for interfacing to the main memory 110 and also includes the arbitration logic 107. The chipset logic 106 preferably includes various peripherals, including an interrupt system, a real time clock (RTC) and timers, a direct memory access (DMA) system, and ROM/Flash memory (all not shown). Other peripherals (not shown) are preferably comprised in the chipset logic 106, including communications ports, diagnostic ports, command/status registers, and non-volatile static random access memory (NVSRAM).

The host/PCI/cache bridge or chipset logic 106 also interfaces to a local expansion bus or system bus 120. In the preferred embodiment, the local expansion bus 120 is the peripheral component interconnect (PCI) expansion bus 120. However it is noted that other local buses and/or expansion buses may be used. Various types of devices may be connected to the PCI bus 120.

One or more multimedia devices or multimedia devices 142, 144, and 146 are coupled to the PCI bus 120. The multimedia devices 142–146 include interface circuitry 170 which includes standard PCI interface circuitry for communicating on the PCI bus 120

The multimedia devices 142–146 may be any of various types of input/output devices, including multimedia devices and communication devices. For example, the multimedia devices 142–146 may comprise video accelerator or graphics accelerator devices, video playback devices, MPEG encoder or decoder devices, sound devices, network interface devices, SCSI adapters for interfacing to various input/output devices, such as CD-ROMS and tape drives, or other devices as desired.

Thus, the multimedia devices 142–146 may communicate with each other via the PCI expansion bus 120 and also communicate with the CPU and main memory 110 via the PCI expansion bus 120, as is well known in the art.

According to the present invention, as part of the bus interface logic 170, two or more of the multimedia devices 142–146 include data packing logic 178 and, optionally, byte slicing logic 176. The data packing logic 178 in a respective device enables the respective device to pack non-optimal data types, i.e. data types which do not match the bus width, onto the 32/64-bit PCI expansion bus 120.

AT expansion bus bridge logic 150 may also be coupled to the PCI bus 120. The AT expansion bus bridge logic 150 interfaces to an AT expansion bus 152. The expansion bus 152 may be any of varying types, preferably the industry standard architecture (ISA) bus also referred to as the AT bus, the extended industry standard architecture (EISA) bus, or the microchannel architecture (MCA) bus. Various devices may be coupled to the AT expansion bus 152, such as expansion bus memory or a modem (both not shown).

Multimedia Devices

Figure 3:
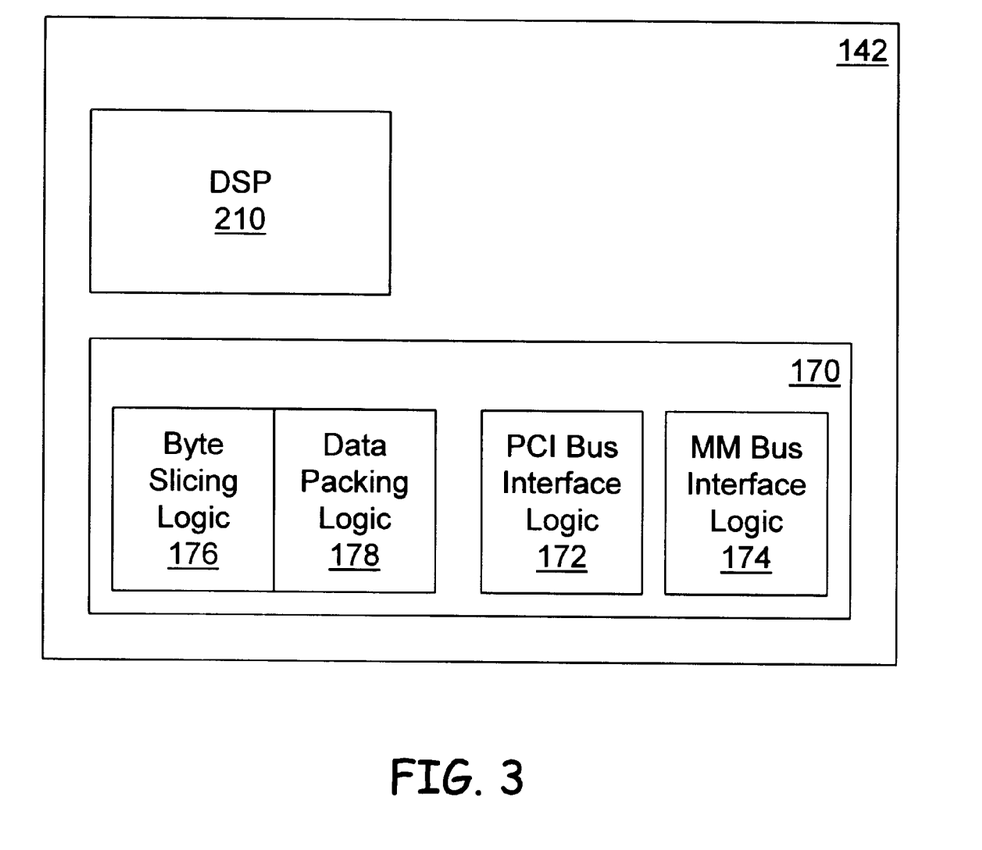
FIG. 3 is a block diagram of a multimedia device in the computer system of FIG. 1.

Referring now to FIG. 3, a block diagram is shown illustrating one of the multimedia devices 142–146, such as multimedia device 142. As shown, the multimedia device 142 includes interface logic 170 comprising PCI interface circuitry 172 for communicating on the PCI bus 120 and also including multimedia bus interface logic 174 for interfacing to the multimedia bus 130.

The multimedia device 142 also may include a digital signal processor (DSP) 210 or other hardware circuitry for implementing a multimedia or communications function. Each of the multimedia devices 142–146 preferably includes the interface logic 170, as shown in FIG. 2. The multimedia devices 142–146 preferably use the multimedia or real-time bus 130 only for high speed data transfers of real-time stream data information. In one embodiment the multimedia bus 130 transfers only periodic stream data, i.e., data streams which require periodic transfers for multimedia or communication purposes, as described above. Examples of periodic data include audio data, which is typically transmitted at 44,100 samples per second, video data, which is typically transmitted at 30 frames per second, or real-time communication streams at rates dependent on the transport media and signal conditioning processing. In an alternate embodiment, the multimedia bus 130 is used for any of various types of multimedia or communications data transfers, including both periodic and aperiodic data.

As shown, the multimedia device 142 also includes data packing logic 178 for performing data packing on a respective bus. The data packing logic 178 is operable to perform data packing on one or both of the PCI expansion bus 120 and/or the multimedia bus 130. Any reference to "bus" or "data packed bus" is meant for the purposes of this disclosure to be either the PCI expansion bus 120 and/or the multimedia bus 130 as desired.

In one embodiment, the byte slicing logic 176 allows multiple sources for transactions to share the bus by dynamically or statically allocating either byte lanes and/or sections of bursts to contain data from different sources with different destinations. This sharing of the bus is preferably accomplished by byte slicing logic 176 and, optionally, data packing logic 178, comprised in intelligent peripherals, memory devices, CPU's and/or subsystems which can place or remove their transaction from the correct byte lane(s) at the correct time(s). When byte slicing logic 176 and data packing logic 178 are present, the data packing logic 178 cooperates with the byte slicing logic 176, and the combination is referred to in this disclosure as unified logic 176/178.

Data Packing Logic and Byte Slicing Logic

Figure 4:
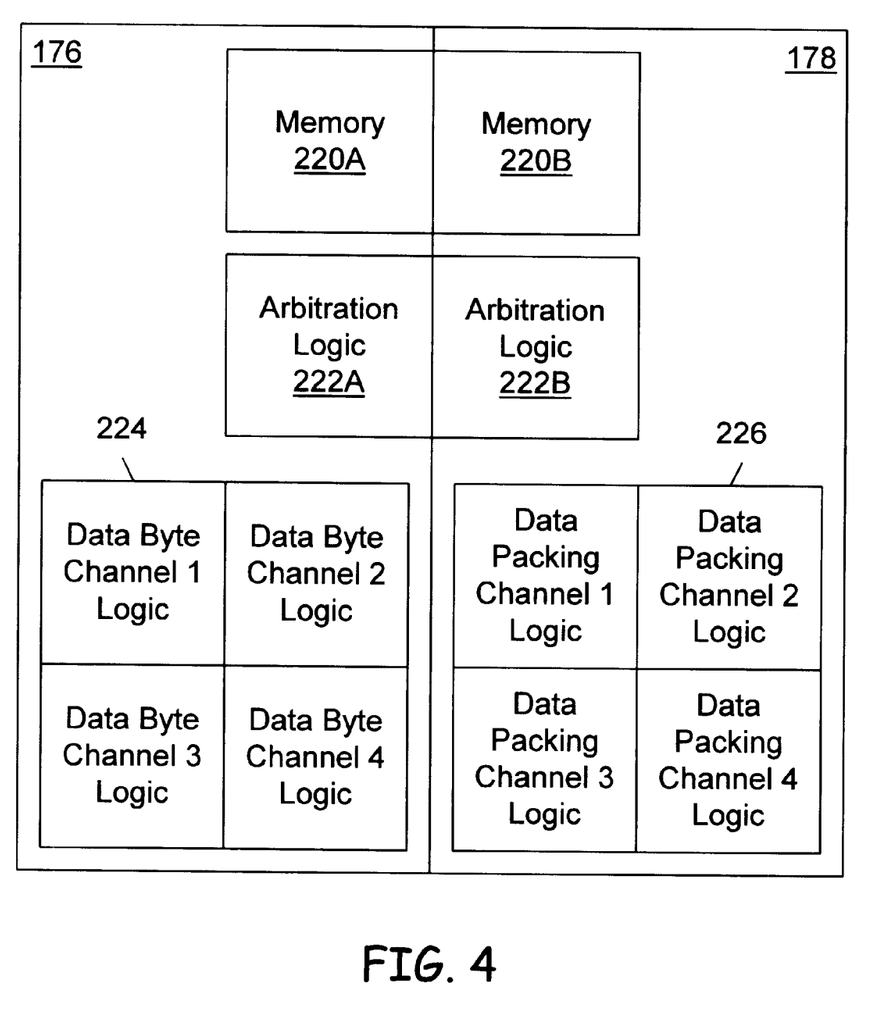
FIG. 4 is a block diagram of data packing logic in the multimedia device of FIG. 2 according to the present invention.

Referring now to FIG. 4, a block diagram is shown illustrating the data packing logic 178 and byte slicing logic 176 shown in FIG. 2. Shown as unified logic 176/178, the data packing logic 178 includes a memory 220B, arbitration logic 222B, and a plurality of data packing channel logics 226 for each data channel of the associated bus. Note that data channels are also referred to as data byte channels. The byte slicing logic 176 also includes a memory 220A, arbitration logic 222A, and a plurality of data channel logics 224 for each data channel of the associated bus. FIG. 4 illustrates an embodiment designed for a bus with four data channels, i.e., a 32 bit bus. Although four data channels are shown, other numbers of byte channels, i.e., other size data buses, such as a 64 bit or 128 bit bus, are contemplated. It is also noted that the logic 176 and/or logic 178 may slice the bus according to different granularities including nibbles (4 bits), bytes (8 bits), words (16 bits), dwords (32 bits) or combination thereof. The logic 176, and/or logic 178, may also slice one or more individual bits of the bus in a serial manner, creating one or more serial channels, in combination with the above. The word "byte" as used in this disclosure is intended to extend to all possible granularities of the bus, from a single bit to the entire bit width of the bus.

The byte slicing logic 176 or unified logic 176/178 of a first multimedia device 142 assigns a first data stream on a first set of one or more data channels and the byte slicing logic 176 or unified logic 176/178 in a second multimedia device 144 assigns a second data stream on a second set of one or more data channels. The first data stream is transferred on the first one or more data channels concurrently with the second data stream being transferred on the second one or more data channels.

In another embodiment, the byte slicing logic 176 or unified logic 176/178 of a first multimedia device 142 operates to assign a video stream on a first set of one or more data channels comprising the multimedia bus 130, and the byte slicing logic 176 or unified logic 176/178 in a second multimedia device 146 operates to assign an audio stream to a second set of one or more data channels comprising the multimedia bus 130, where the first set and the second set of one or more data channels are different groupings of data channels. The video stream is transferred on the first set of one or more data channels concurrently with the audio stream being transferred on the second set of one or more data channels.

In still another embodiment, the byte slicing logic 176 or unified logic 176/178 of a multimedia device 146 operates to selectively and dynamically assign data streams on selected ones of the data channels comprising the multimedia bus 130. In other words, the byte slicing logic 176 or unified logic 176/178 selectively assigns a data stream to a select set of one or more data channels at one point in the data transmission and may then reassign in a dynamic fashion which data channels are used for the transmission. In yet another embodiment, this selection process is active and continuous from the time the data transmission starts until the data transmission ends.

In another embodiment, the data packing logic 178 and/or byte slicing logic 176 may also include a memory 220 for storing data bandwidth, data source, and/or data destination information for each of the multimedia devices 142–146 attached to the byte sliced and/or data packed bus 120/130. The byte slicing logic 176, or unified logic 176/178, in each multimedia device 142–146 operate, to selectively and dynamically assign data streams on selected ones of the data channels comprising the bus using the data bandwidth, data source, and/or data destination information for each of the multimedia devices 142–146. The data bandwidth information may include data rate and/or data periodicity information. The memory 220 may be adapted to receive any or all of the data bandwidth, data source, and data destination information for the respective multimedia devices 142–146 from said CPU 102 other master device or storage location. The CPU 102 may program the memory 220 with the data bandwidth, data source, and/or data destination information for each of the multimedia devices 142–146 at start-up of the computer system. The CPU 102 may also dynamically program the memory 220 with any or all of the data rate, data periodicity, data source, and data destination information for each of said multimedia devices 142–146 dependent on real time processes and applications executing in the computer system.

The data packing logic 178 and byte slicing logic 176 for each respective multimedia device 142–146 may also include bus monitoring logic, also called data channel logic 224 and/or data packing channel logic 226, for monitoring conditions on the byte sliced bus and for detecting collisions on the byte sliced bus. The byte slicing logic 176 or unified logic 176/178 for each respective multimedia device 142–146 may also include an arbitration logic 222 for determining if and when one or more respective data channels are available for the respective multimedia device 142–146.

In another embodiment, the byte slicing logic 176 and the data packing logic 178 are combined as unified logic 176/178. Memory 220A/B, arbitration logic 222A/B, and the data channel logic 224 and the data packing channel logic 226 are also unified. In this embodiment, the unified logic 176/178 byte slices and data packs the bus as disclosed herein.

Byte Sliced and/or Data Packed Bus Usage

Figure 5:
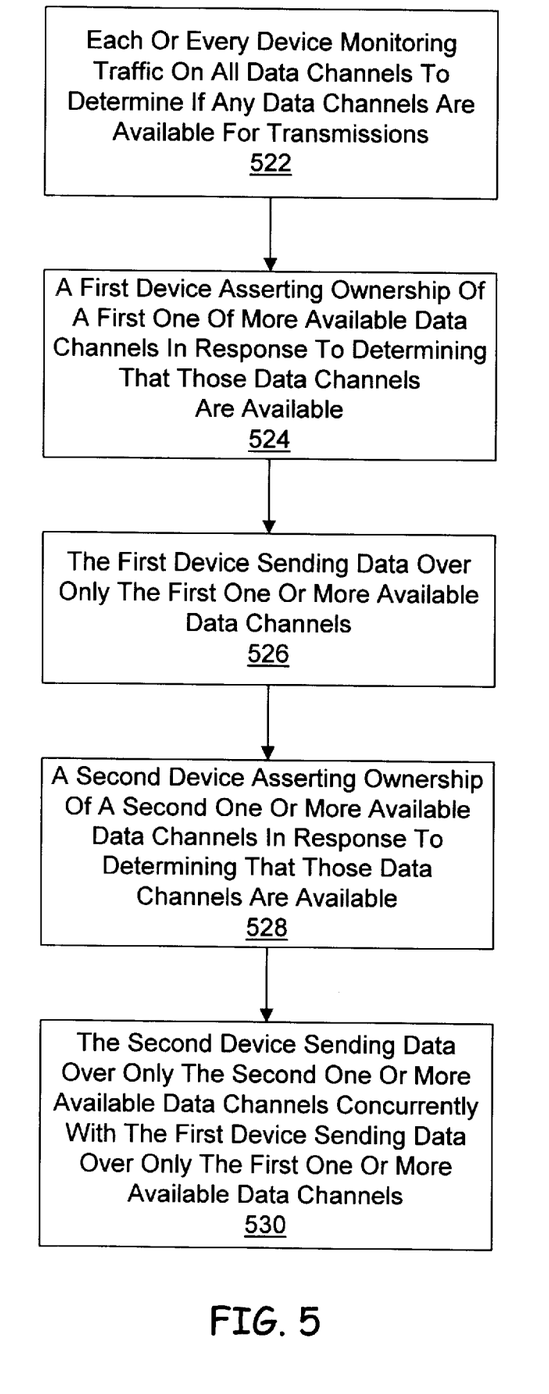
FIG. 5 is a flowchart diagram illustrating an embodiment of the operation of the data packing logic according to the present invention.

Referring now to FIG. 5, the present invention contemplates a method for transferring data on a bus in a computer system using byte slicing techniques. This method presumes a computer system similar to that shown in FIG. 1, wherein the computer system comprises a multimedia bus 130 and/or an expansion bus 120 including a plurality of data channels for transmitting data, and a plurality of multimedia devices are coupled to the multimedia bus, wherein each of said multimedia devices perform operations on said multimedia bus 130 and/or expansion bus 120. As shown, in 522, each device 142–146 coupled to the bus 120 monitors the data traffic being transmitted on all of the data channels which make up the bus 120. Each device 142–146 determines the availability of each or every data channel.

In 524, a first device 142 asserts ownership over a first one or more available data channels out of all possible data channels. The asserting in 524 occurs in response to the monitoring in 522 as a result of a need to conduct a transfer. In 526 the first device 142 sends data over only the first one or more available data channels identified in 522 and owned in 524. Data traffic on the remainder of the data channels of the bus 120 are unaffected in any way by the transmission in 526. The presence or lack thereof of other data traffic on other data channels have no impact on the transmission of 526. In 528 a second device 144 asserts ownership over a second one or more available data channels out of all possible data channels. The asserting in 528 occurs in response to the monitoring in 522. In 530 the second device 144 sends data over only the second one or more available data channels identified in 522 and owned in 528. Data traffic on the remainder of the data channels of the bus 130 are unaffected in any way by the transmission in 526. It is noted that the first data stream is transferred in 526 on the first one or more data channels substantially concurrently with the second data stream being transferred in 530 on the second one or more data channels.

Still referring to FIG. 5, another way of illustrating the method of usage of the byte sliced and/or data packed bus is given. The method is for transferring data on a bus in a computer system when the computer system comprises a multimedia bus 130 including a plurality of data channels for transmitting data, and a plurality of multimedia devices 142–146 coupled to the multimedia bus 130. Each of the multimedia devices 142–146 perform operations on the multimedia bus 130, and each of the multimedia devices 142–146 includes multimedia bus interface logic 170 for accessing the multimedia bus 130 and performing data transfers on the multimedia bus 130. Each of said multimedia bus interface logics 170 also includes data packing logic 178 and/or byte slicing logic 176 which couples to the multimedia bus 130.

As shown, in 522, each multimedia device 142–146 coupled to the multimedia bus 130 monitors the data traffic being transmitted on all of the data channels which make up the multimedia bus 130. Each device 142–146 determines the availability of each or every data channel. In 524, a first multimedia device 142 asserts ownership over a first one or more available data channels out of all possible data channels. The asserting in 524 occurs in response to the need to transfer and the monitoring in 522. In 526 the first multimedia device 142 sends data over only the first one or more available data channels identified in 522 and owned in 524. Data traffic on the remainder of the data channels of the multimedia bus 130 are unaffected in any way by the transmission in 526. In 528 a second multimedia device 144 asserts ownership over a second one or more available data channels out of all possible data channels. The asserting in 528 occurs in response to the need to transfer and the monitoring in 522. In 530 the second multimedia device 144 sends data over only the second one or more available data channels identified in 522 and owned in 528. It is noted that various of the steps in the flowchart of FIG. 5 may be performed concurrently and/or in different order than that shown.

Figure 6:
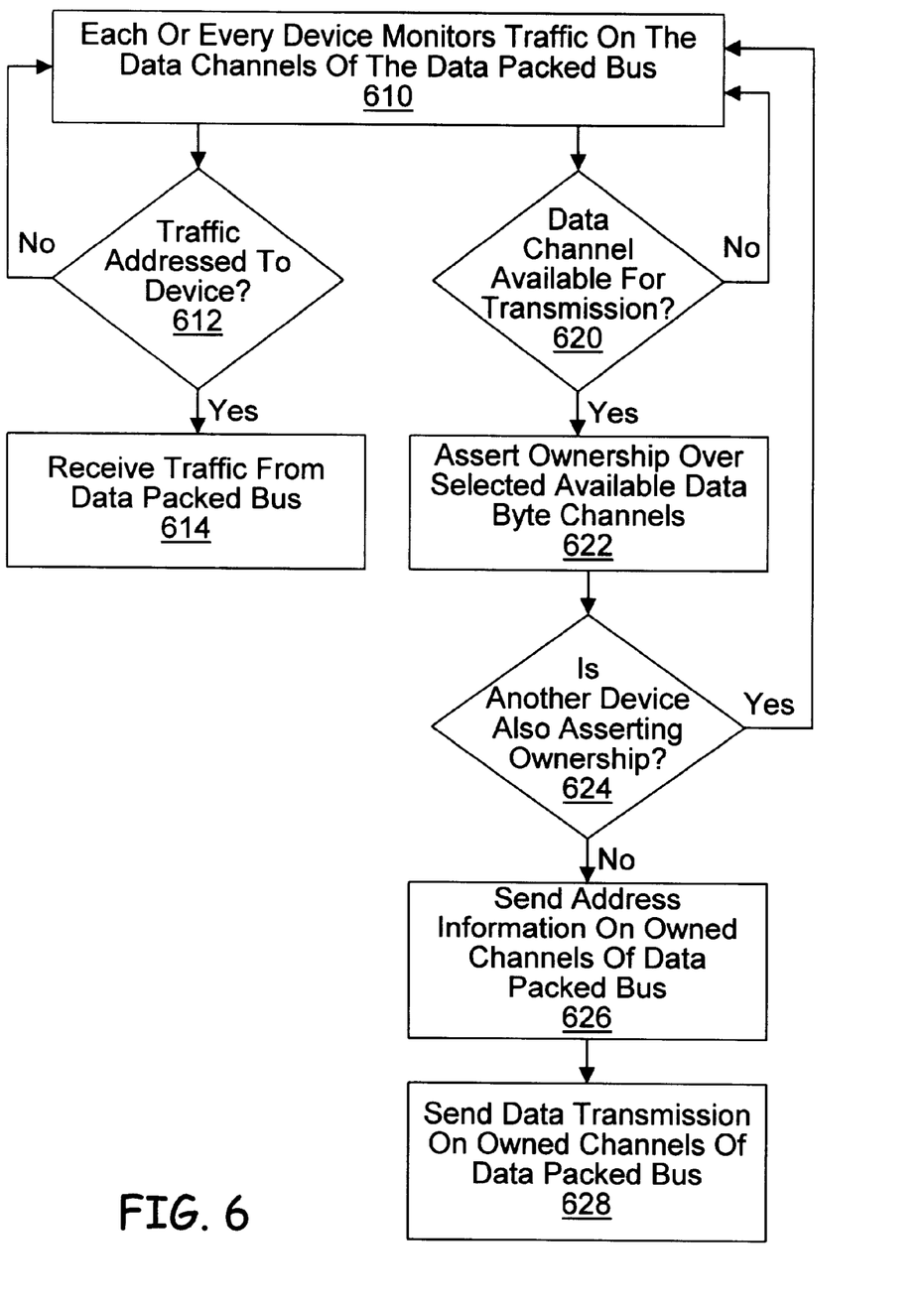
FIG. 6 is a flowchart diagram illustrating another embodiment of the operation of the data packing logic according to the present invention.

Referring now to FIG. 6, a flow chart is shown illustrating another embodiment of a method of usage of the byte sliced and data packed bus. The method is for non-centralized arbitration for use of a byte sliced bus 120 in a computer system when the computer system comprises the data packed bus 120 including a plurality of data channels for transmitting data, and a plurality of multimedia devices 142–144 coupled to the data packed bus 120. Each of the devices 142–146 perform operations on the data packed bus 120, and each of the devices 142–146 includes bus interface logic 170 for accessing the bus 120 and performing data transfers on the bus 120. Each of the bus interface logics 170 includes unified logic 176/178 which couples to the bus 120. Each of the devices also includes an arbitration logic 222.

In 610, each device 142–146, preferably through the arbitration logics 222 in each of the devices 142–146 monitors traffic on the data channels of the data packed bus 120. In response to traffic or lack thereof on the data channels of the data packed bus 120, each of the devices 142–146 determines in 612 if the traffic is directed to an address mapped to the respective device 142–146, and the data packing logic 178 and, optionally, byte slicing logic 176 in each of the respective devices 142–146 monitors traffic in 620 on the plurality of data channels to determine availability of each of the plurality of data channels. When there is data traffic on the bus 120, the device 142–146 receives that traffic from the bus 120 in 614 if the device determines in 612 that the traffic is intended for the device 142–146.

If the device 142–146 needs to transfer data and determines in 620 that there is a time where there is no traffic on one of more of the plurality of data channels of the data packed bus 120, and that in 620 one or more of the data channels is available for transmitting data, the arbitration logic 222 in a sending device asserts ownership of the available one or more data channels during the times of inactivity in 622 in response to the unified logic 176/178 in the sending device determining availability of the one or more data channels during times of inactivity. The sending device 142–146 receives transmission ownership information from its respective arbitration logic 222 in response to its respective arbitration logic 222 asserting ownership over the one or more data channels in 624. Should a collision occur between the sending device 142 and another sending device 144, the arbitration logic 222 in the sending device 142 and any other sending device 144 arbitrate for channel ownership in any other number of well-known arbitration methods.

When the sending device 142 is the only device 142–146 asserting ownership of the one or more data channels, the sending device 142 generates in 626 address information on the owned channels of the data packed bus 120 for a data transmission. This address information preferably includes the one or more data channels used for the data transmission, a destination device identification designation, and a data transfer designation providing to the destination device the purpose of the data transmission. The sending device 142 then sends in 628 the data transmission on the data packed bus only on the one or more data channels over which the device 142 has ownership.

In another embodiment, a time when there is traffic or a lack of traffic on the data packed bus 120, the bus 120 is divided into a set of time-slices including transfer time-slices and inactivity time-slices. Transfer time-slices occur during 610, 626 and 628. Inactivity time-slices occur during 622. It is noted that various of the steps in the flowchart of FIG. 6 may be performed concurrently and/or in different order than that shown.

Data Flow on A Byte Sliced and Data Packed Bus

Figure 7:
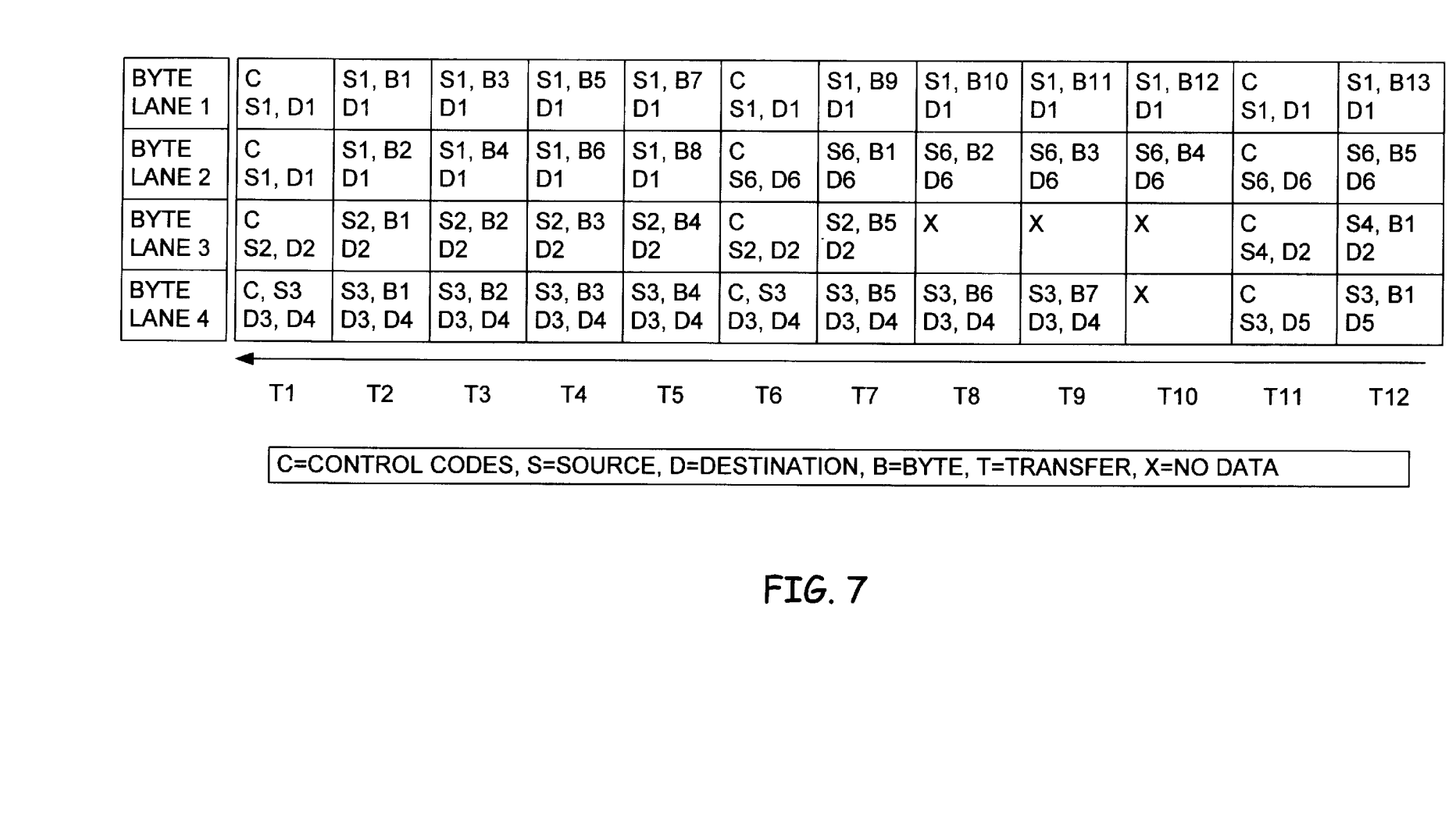
FIG. 7 is a block diagram of traffic on multiple data channels over a period of time.
Figure 8:
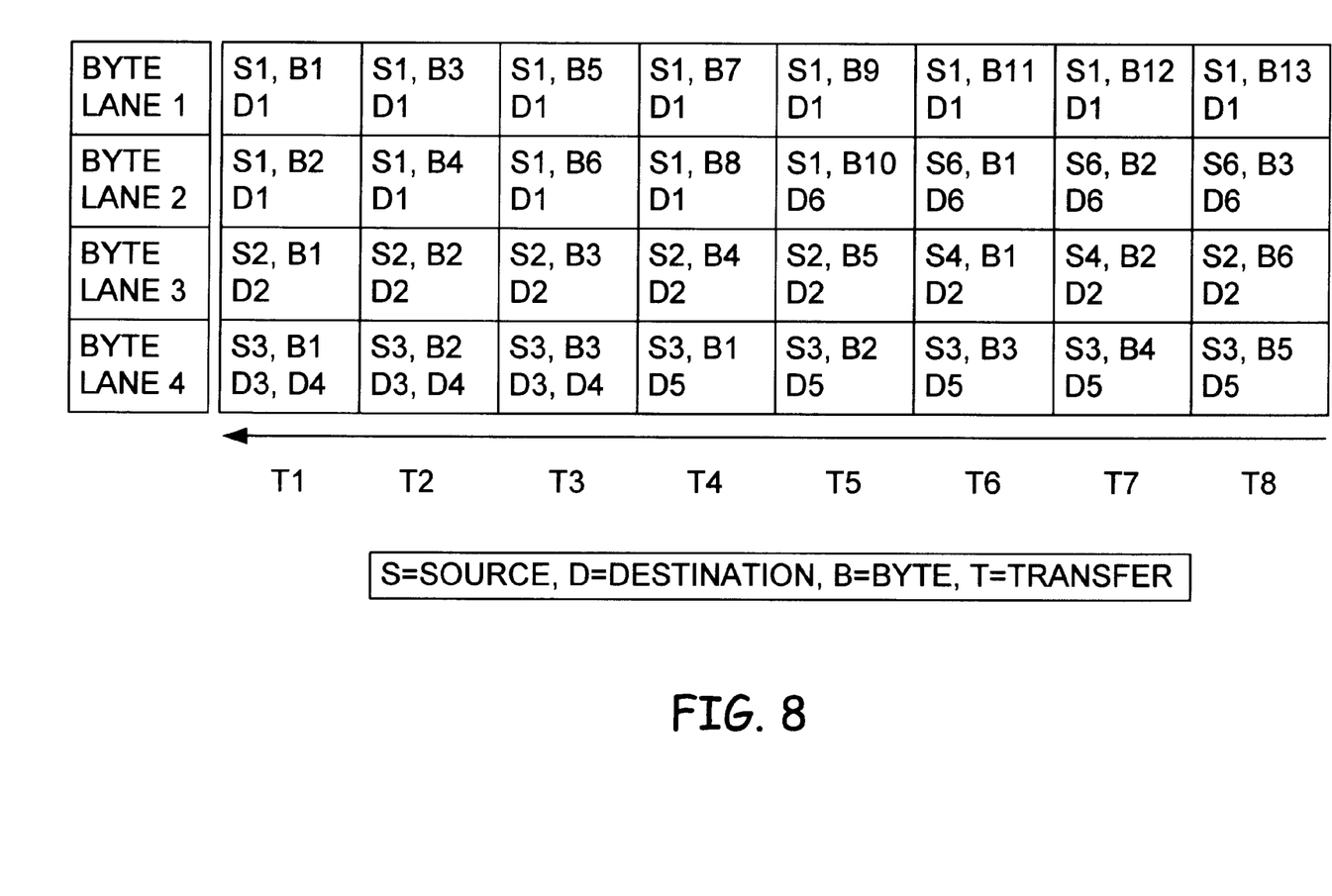
FIG. 8 is a block diagram of traffic on multiple data channels over a period of time according an embodiment of the present invention.

FIGS. 7 and 8 illustrate the type of information that can flow across the multi-byte wide bus using the present invention. In the embodiment of FIG. 7, each of byte lanes can independently transfer data according to the byte slicing logic 176. During transfer T1, each respective byte lane transfers a control block setting up the source and destination for all transfers within that byte lane for the next four transfer times. Thus each fifth transfer time is a new control block giving source and destination information on that byte lane. Other intervals of control blocks are also contemplated. With respect to FIG. 7, byte lane 1 and byte lane 2 each have a control block during transfer T1 indicating that the following transfers will be from source S1 to destination D1. During transfer Times T2–T5, bytes B1–B8 are transferred on byte lanes 1 and 2. During transfer T6, byte lane 1 has a control block indicating transfer from source S1 to destination D1, while byte lane 2 has a control logic indicating a transfer from source S6 to destination D6. Byte lane 1 continues the source S1 to destination D1 transfer by transferring byte B9, byte B10, byte B11, and byte B12 during transfer T7, T8, T9 and T10, respectively. Byte lane 2 has interrupted the source S1 to destination D1 transfer with the transfer from source S6 to destination D6 with bytes B1–B4 being transferred during transfers T7–T10.

Byte lane 3 shows the following transfers. During transfer T1, a control block indicating a transfer from source S2 to destination D2, followed by bytes B1–B4 during transfers T2–T5. During transfer T6, a control block indicates the continuation of the transfer between source S2 and destination D2. Transfers completed with byte 5 during transfer T7. Note that on byte lane 3, during transfers T8 through T10, no data are transferred. Byte lane 4 illustrates a broadcast transfer from source S3 to the dual destinations of D3 and D4.

In the embodiment of FIG. 8, Sources and Destination transactions for sources S2 through S6 occur while source S1 is transferring. In addition, source S1 is able to relinquish one byte lane to allow source S6 to begin transmitting to destination D6 and source S2 is able to allow two transfers by source S4 before resuming its transfer. Note that unlike the embodiment of FIG. 7, the byte slicing logic 176 in FIG. 8 is able to fill all available transfer slots with data. In other contemplated embodiments, the control blocks are sent over separate control lines or are sent for each transfer or only as necessary.

This methodology optimizes the bus utilization by packing and unpacking information into every transfer on the bus. The system arbitrates for both time and byte lane access rights either on a continual basis or by setting up pre-defined or agreed upon utilization patterns which allow either intelligent entities to transact or intelligent DMA devices to pack and unpack information transactions.

As examples of data packing, consider 8-bit data being transferred on a 64-bit wide bus, the data packing logic 178 can byte pack up to eight data units onto each bus transfer, or time slice, of the bus. This is opposed to byte slicing, where, for example, 32-bit data could be divided into 8-bit groups for transmission on a single byte lane of the two byte lanes available on a 16-bit wide bus. These values are exemplary only and other sizes of data and buses are contemplated, including slicing to/on a single bit line.

The present invention includes a method for intelligently byte slicing/data packing a transmission onto a multi-bit wide bus. The bus comprises L data channels while the transmission comprises a plurality of blocks of N units each. The method comprises examining the bus for available data channels, transmitting concurrently during a first transmission time a first subgroup of data blocks over one or more of the M data channels that are available, and then repeating the examining and the transmitting as necessary or needed to complete the transmission. Examining the bus to determine availability of the L data channels may include determining the usage of each, all or any of the data channels which make up the bus, that is, determining that M data channels are available, wherein M is less than or equal to L. All or any subset of the L data channels may be available for any particular transmission time. Transmitting on the multi-bit wide bus over the M data channels includes a first group of a first plurality of complete blocks being sent over the M data channels. Transmitting over the M data channels is performed in response to examining the L data channels. A "data channel" may include a bit line, a byte lane or any other cross section of the bus, as desired.

Examining and transmitting are performed individually and/or collectively by each of one or more devices coupled to the bus. The devices performing the examining and the transmitting may operate to substantially pack the bus, or to completely pack the bus. A completely packed bus has data blocks filling all available data channels during all available transmission times or time slices.

The present invention also includes a method for intelligently byte slicing/data packing a plurality of transmissions onto a multi-bit wide bus. The bus comprises L data channels while the transmissions comprise one or more blocks. A first transmission and a second transmission each comprise a first one or more data blocks and a second one or more data blocks, respectively. The method comprises the first device examining the bus, a second device examining the bus, the first device transmitting during a first transmission time, and the second device also transmitting during the first transmission time. The first device examines the bus to determine availability of any of the plurality L of data channels. The first device determines that P data channels are available, where P is less than or equal to L. Concurrently, the second device examines the bus to determine availability of any of the plurality L of data channels. The second device determines that Q data channels are available, where Q is less than or equal to L.

The first device transmits during a first transmission time a first data block of the first one or more data blocks on the multi-bit wide bus over a first data channel of the plurality P of available data channels. The second device also transmits during the first transmission time a first data block of the second one or more data blocks on the multi-bit wide bus over a second data channel of the plurality Q of data channels. The P data channels and the Q data channels may overlap, or they may be mutually exclusive. The first and second device may transmit over all P and Q data channels, respectively, or just one or more of the P and Q data channels available for transmission. Transmission occurs in response to the one or more devices examining the bus.

The method may also include a third transmission being byte sliced/data packed onto the multi-bit wide bus. The third transmission comprises a third one or more data blocks. A third device examines the bus to determine availability of any one of the plurality L of data channels. Examining determines that R data channels are available, where R is less than or equal to L. Preferably, examining occurs during the first transmission time. Examining may also occur during a second transmission time or before the first transmission time. In a preferred embodiment, any device may yield control over one or more of the plurality P of available data channels that are under that device's control. Yielding occurs in response to another device examining the bus, determining that data channels are in use, and requesting a data channel that is in use. The third device then transmits during a second transmission time a first data block of the third one or more data blocks on the multi-bit wide bus over the yielded one or more data channels of the plurality P of available data channels. Also during the second transmission time, another or additional data blocks may be transmitted over one or more of the other data channels of the bus. The another or additional data blocks may be transmitted by the first, second, third, or other device. In addition, multiple data streams transmitted from a single device may also be data packed onto the bus, as desired.

According to the present invention, data streams having a different number of bits then the bus over which the data streams are to be transmitted, may be transformed or manipulated by the data packing logic in a transmitting device into blocks of data with widths approximately the size of the bus or channels of the bus. The data packing logic in a receiving device would been recreate the original data stream from the transformed data stream. For example, for transfer a 32-bit wide bus, the data stream comprised of seven bit data are transformed into 32-bit wide blocks, or as close as possible. If the 32-bit wide bus has four eight bit wide data channels, and each data channel is capable of independent data transmission, then the data packing logic packs the seven bit data into eight bit blocks, at its best, for transmission. Data packing logic in a receiving device recreates the original seven bit data stream from the packed data blocks.

Conclusion

Therefore, the present invention comprises a novel computer system architecture which increases the performance of real-time applications. The computer system includes a PCI local bus and/or a real-time or multimedia bus. Each of the peripheral devices includes byte slicing logic and/or data packing logic for performing transfers on different byte lanes of a respective bus.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for transmitting data on a bus including a plurality of data channels, wherein a plurality of devices are coupled to said bus, wherein said method comprises:
   each of said devices monitoring traffic on said plurality of data channels to determine availability of each of said plurality of data channels during times of inactivity;
   a first device asserting ownership of a first one or more of said plurality of data channels in response to the first device determining availability of said first one or more of said plurality of data channels;
   the first device transferring data only on said first one or more data channels of the bus for a first data transmission;
   a second device asserting ownership of a second one or more of said plurality of data channels in response to the second device determining availability of said second one or more of said plurality of data channels; and
   the second device transferring data only on said second one or more data channels of the bus for a second data transmission, wherein said first data transmission and said second data transmission occur concurrently, and wherein said first one or more data channels are separate and distinct from said second one or more data channels.

2. The method of claim 1, further comprising:
   each of said devices determining if the traffic is directed to itself; and
   one of said devices reading said traffic in response to the one of said devices determining if the traffic is directed to the one of the devices.

3. The method of claim 1, the method further comprising:
   a device deasserting ownership of said one or more of said plurality of data channels in response to another device concurrently asserting ownership of said one or more of said plurality of data channels.

4. The method of claim 1, wherein said data transfers comprise address information, wherein said address information comprises information specifying one or more of said plurality of data channels used for data transmission, a destination device identification designation, and a data transfer designation designating a type of data transmission.

5. The method of claim 1, wherein traffic on the bus is divided into a set of time-slices comprising transfer time-slices and inactivity time-slices;
   wherein said monitoring traffic on said one or more of said plurality of data channels occurs during said transfer time-slices;
   wherein said asserting ownership on said one or more of said plurality of data channels occurs during said inactivity time-slices; and
   wherein data transmission occurs during said transfer time-slices.

6. A method for transmitting a transmission over a multi-bit wide bus, wherein the bus comprises L data channels, wherein the transmission comprises a plurality of blocks of N units each, the method comprising:
   examining the bus to determine availability of each of said L data channels, wherein said examining determines that M data channels are available, wherein M is less than L;
   transmitting concurrently over the M data channels during a first transmission time a first plurality of blocks of the transmission, wherein said transmitting over the M data channels is performed in response to said examining.

7. The method of claim 6,
   wherein said examining and said transmitting are performed by one of a plurality of devices coupled to the bus;
   wherein another of said plurality of devices transmits blocks of another transmission to substantially pack said bus.

8. The method of claim 6,
   wherein said examining and said transmitting are performed by one of a plurality of devices coupled to the bus;
   wherein another of said plurality of devices transmits blocks of another transmission to completely pack said bus.

9. A method for intelligently transmitting a first transmission and a second transmission onto a multi-bit wide bus, wherein said first transmission comprises a first one or more data blocks, wherein said second transmission comprises a second one or more data blocks, and wherein said bus comprises a plurality L of data channels, the method comprising:

a first device examining the bus to determine availability of each of said plurality L of data channels, wherein said examining determines that P data channels are available, wherein P is less than to L;

a second device examining the bus to determine availability of each of said plurality L of data channels, wherein said examining determines that Q data channels are available, wherein Q is less than to L;

the first device transmitting during a first transmission time a first data block of the first one or more data blocks on the multi-bit wide bus over a first data channel of the plurality P of available data channels;

also transmitting during the first transmission time a first data block of the second one or more data blocks on the multi-bit wide bus over a second data channel of the plurality Q of available data channels, wherein the first data channel is separate and distinct from the second data channel.

10. The method of claim 9, wherein a third transmission is also transmitted onto the multi-bit wide bus, wherein said third transmission comprises a third one or more data blocks, the method further comprising:

a third device examining the bus to determine availability of each of said plurality L of data channels, wherein said examining determines that R data channels are available, wherein R is less than L, wherein said examining occurs during the first transmission time;

the first device yielding control over one or more of the plurality P of available data channels; and the third device transmitting during a second transmission time a first data block of the third one or more data blocks on the multi-bit wide bus over said yielded one or more data channels of the plurality P of available data channels.

11. The method of claim 10, further comprising:

transmitting during the second transmission time another data block of the second one or more data blocks on the multi-bit wide bus over said second data channel of the plurality Q of data channels.

12. A computer system which intelligently byte slices and data packs a bus, comprising:

a CPU;

main memory coupled to the CPU which stores data accessible by the CPU;

bridge logic coupled to the CPU and to the main memory, wherein the bridge logic comprises bus interface logic and a memory controller coupled to the main memory;

a bus coupled to the bridge logic, wherein said bus transmits data, wherein said bus includes a plurality of data channels for transmitting data; wherein said bus interface logic further examines the bus to determine available data channels; and a plurality of devices coupled to said bus, wherein each of said devices perform operations on said bus, wherein each of said devices includes bus interface logic for accessing said bus and performing data transfers on said bus, wherein the bus interface logic of each device examines the bus to determine availability of said bus;

wherein each of said devices comprises unified byte slicing and data packing logic which couples to the bus, wherein the unified byte slicing and data packing logic for each device operates to determine availability of said bus and operates to selectively assign data streams on the bus when the bus is available during one or more transmission times in response to the determined availability of said bus;

wherein each of said devices is operable to generate an internal data stream, wherein said internal data stream has a bit width defined by an original configuration that is different from a bit width of the bus;

wherein said unified byte slicing and data packing logic in a first device manipulates said internal data stream to have a bit width to approximately fit said bus;

wherein said first device transmits said manipulated internal data stream to a second device;

wherein said second device receives said manipulated internal data stream; and wherein said unified byte slicing and data packing logic comprised in the second device recreates said original configuration from the received manipulated internal data stream;

wherein the unified byte slicing and data packing logic in each of said devices further operates to determine availability of each of said plurality of data channels and operates to selectably assign internal data streams on selected available ones of said data channels comprising the bus.

13. A method for transmitting data between a first device and a second device onto a bus, wherein the first device and the second device each include data packing logic, wherein the data packing logic further comprises byte slicing logic, wherein the bus is Y bits in width, and wherein said bus includes M data channels for transmitting data, the method comprising:

the data packing logic in the first device manipulating data from an original configuration of X bits in width into a packed configuration of Y bits in width; wherein X does not equal Y;

the data packing logic in the first device determining the availability of L data channels of the bus, wherein L is less than M;

the data packing logic in the first device selectably assigning the manipulated data to the L data channels of the bus;

the first device transmitting the manipulated data to the second device over the bus;

the second device receiving the manipulated data; and the data packing logic in the second device converting the received manipulated data from X bits in width to Y bits in width.

* * * * *